(12) United States Patent
Walters

(10) Patent No.: US 6,379,471 B2
(45) Date of Patent: *Apr. 30, 2002

(54) METHOD OF CLEANING TILE GROUT

(75) Inventor: Roy J. Walters, San Diego, CA (US)

(73) Assignee: Tracey Dalton, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/771,167

(22) Filed: Jan. 26, 2001

Related U.S. Application Data

(60) Continuation of application No. 09/229,471, filed on Jan. 13, 1999, now Pat. No. 6,180,588, which is a division of application No. 08/861,403, filed on May 21, 1997, now Pat. No. 5,908,350.
(60) Provisional application No. 60/018,980, filed on Jun. 4, 1996.

(51) Int. Cl.[7] .............................. B08B 1/00; B24B 1/00; B24B 7/22; C11D 3/08; C11D 3/20
(52) U.S. Cl. .......................... 134/39; 134/38; 134/42; 510/238; 510/240; 510/364; 510/366; 510/442; 510/446; 510/466; 451/28
(58) Field of Search .................. 510/238, 240, 510/364, 366, 442, 446, 466; 134/38, 39, 42; 451/28

(56) References Cited

U.S. PATENT DOCUMENTS

| 2,006,308 | A | | 6/1935 | Bush et al. ............... 451/544 |
|---|---|---|---|---|
| 3,982,358 | A | | 9/1976 | Fukuda et al. ........... 451/544 |
| 4,842,650 | A | * | 6/1989 | Blounts ..................... 106/90 |
| 4,945,687 | A | * | 8/1990 | Scheider et al. ........... 51/394 |
| 5,110,361 | A | * | 5/1992 | Alley et al. ............... 106/685 |
| 5,214,820 | A | | 6/1993 | Shumway et al. ...... 451/524 X |
| 5,454,844 | A | * | 10/1995 | Hibbard et al. ............ 51/295 |
| 5,663,267 | A | * | 9/1997 | Frost ..................... 526/328.5 |
| 5,733,178 | A | | 3/1998 | Ohishi ................. 451/527 X |
| 5,908,350 | A | * | 6/1999 | Walters ..................... 451/524 |
| 6,180,588 | B1 | * | 1/2001 | Walters ..................... 510/466 |

OTHER PUBLICATIONS

PCM-121 Flexible Mold Compound—Technical Bulletin, Smooth On, revised 1/92.

* cited by examiner

Primary Examiner—Yogendra N. Gupta
Assistant Examiner—Brian P. Mruk
(74) Attorney, Agent, or Firm—Lyon & Lyon LLP

(57) ABSTRACT

A cleaning tool for cleaning the walls of a swimming pool or other concrete structures. Two different sized aggregate or abrasives are combined with a binder to provide an improved cleaning device. The binder and the aggregates are matched so as to wear at substantially identical rates.

7 Claims, 2 Drawing Sheets

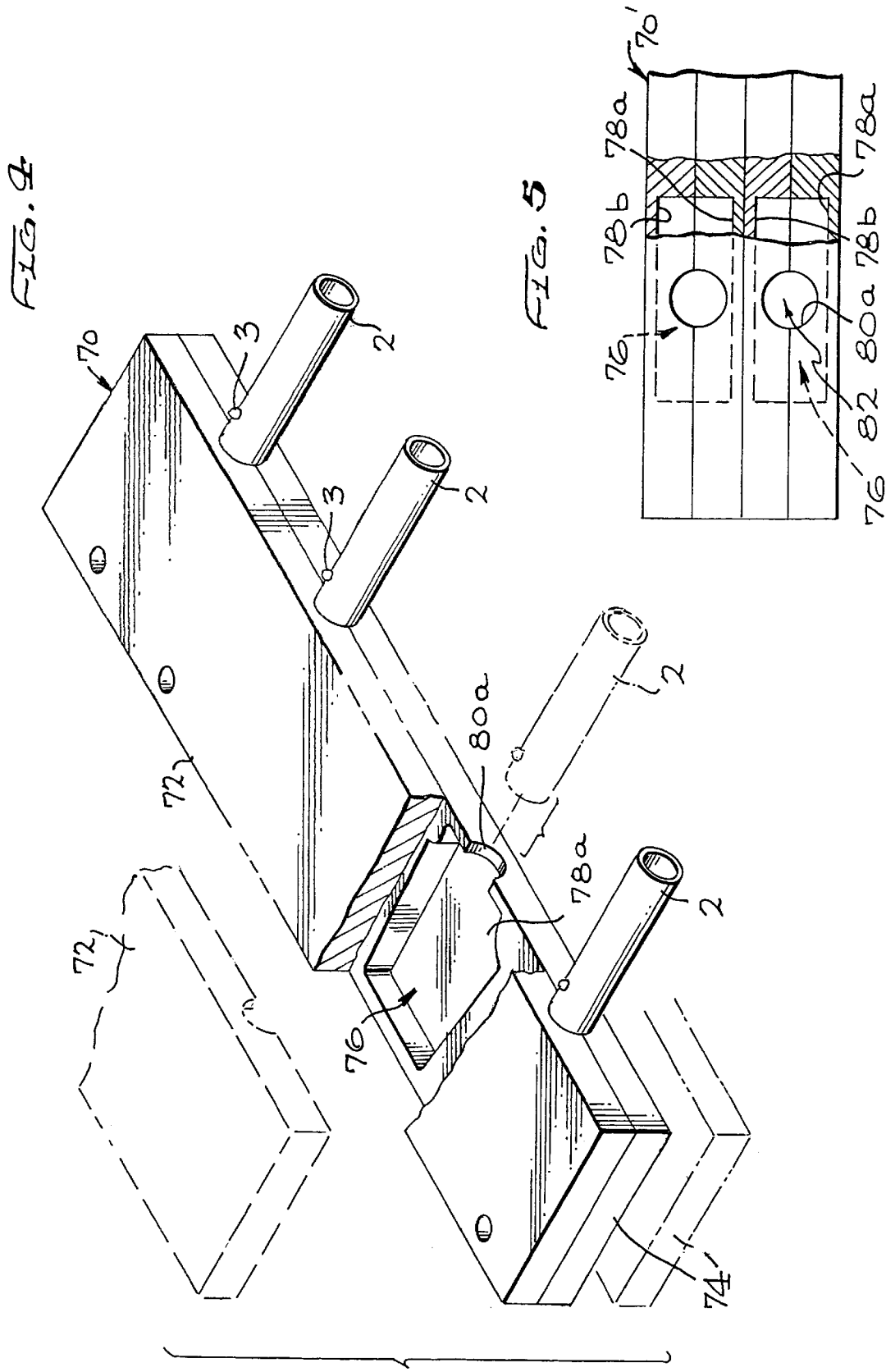

METHOD OF CLEANING TILE GROUT

This is continuation of U.S. patent application Ser. No. 09/229,471, filed Jan. 13, 1999, now U.S. Pat. No. 6,180,588, which is a division of U.S. patent application Ser. No. 08/861,403, filed May 21, 1997, now U.S. Pat. No. 5,908,350, which is a continuation-in-part of provisional application U.S. No. 60/018,980 filed on Jun. 4, 1996.

BACKGROUND OF THE INVENTION

1. Field of the Invention

This invention relates generally to cleaning devices for swimming pools and concrete, and in particular, to a device for cleaning rust spots, calcium deposits, etc. from swimming pool walls and concrete.

2. Description of the Related Art

In-ground swimming pools are sometimes formed of concrete, gunite or plaster (generally referred to herein as concrete). Algae stains, metal stains, and calcium scale often build up on the walls of swimming pools. Some stains may be removed with a brush or rag, but persistent stains such as calcium scale are more difficult to remove. If the swimming pool becomes extremely stained, it is well known to drain and "acid wash" the entire pool. This typically includes scrubbing the pool walls with a diluted mixture of muriatic acid and water and sometimes the use of bleach. This, of course, is highly undesirable because tens of thousands of gallons of water are wasted by emptying the pool, and muriatic acid is dangerous to work with. In addition, in-ground swimming pools are structurally designed to be filled with water, and when they are emptied there is a danger that the hydrostatic pressure underneath the pool can cause the pool floor to crack.

Accordingly, there is a long-felt need in the art for a cleaning device for concrete swimming pools, patios, paths, driveways and other concrete structures that can effectively remove stains, and is easy to use and avoids the necessity of draining the pool.

SUMMARY

Accordingly, one object of the present invention is to overcome the difficulties of the prior art.

The present invention is directed to a cleaning composition for cleaning concrete pools and other concrete devices. The composition includes an aggregate which is an abrasive that does the cleaning, and a binder that holds the aggregate together to be used in the cleaning process. The present invention achieves a balance between the performance of the aggregate and the binder in that the aggregate and the binder substantially uniformly break down in balance with each other so as to efficiently use the majority or preferably substantially all of each layer of aggregate before the binder releases it, and a new layer is presented. The aggregate must not be harder than the material to be cleaned (e.g. the pool wall) and preferably has the ability to fracture so as to continually expose new cutting or cleaning areas.

Accordingly, in one aspect of the invention the cleaning device for swimming pools comprises a handle, and a cleaning composite formed on the handle including (i) a polymer having an elongation at break of 500%, (ii) a first type of aggregate, and (iii) a second type of aggregate which is smaller than the first type.

Other objects, advantages and features of the invention will become apparent to those of ordinary skill in the art upon reading the detailed description below.

BRIEF DESCRIPTION OF THE DRAWINGS

FIG. 4 is an exploded view of a mold for making the cleaning tool of the invention.

FIG. 5 is a side view of a second embodiment of the mold.

DETAILED DESCRIPTION

Figure 1:
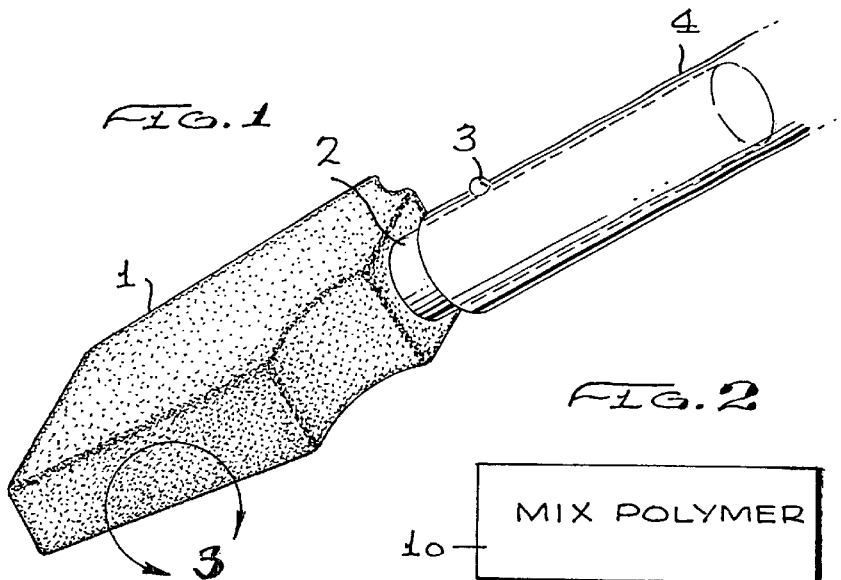
FIG. 1 is a perspective view of the cleaning tool of the invention.

The cleaning tool of the present invention is illustrated in FIG. 1. It includes a cleaning portion 1 and a handle 2 extending therefrom. Handle 2 is preferably provided with a snap clip 3 for engagement in a conventional manner with a swimming pool accessory extension pole 4.

Figure 3:
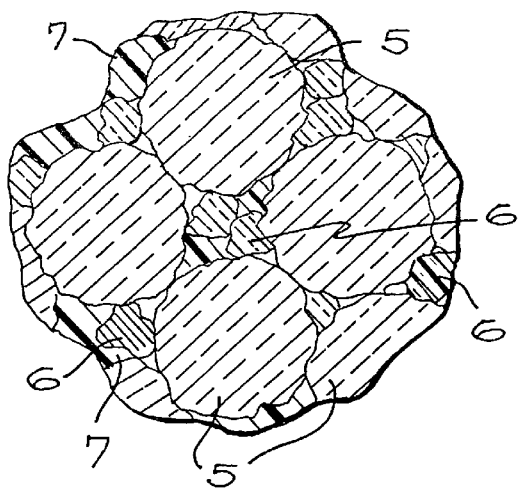
FIG. 3 is a magnified view of the area within circle 3 of FIG. 1.

The cleaning tool is especially useful in removing surface blemishes from concrete or plaster pools and ceramic tile at the waterline of the pool. This includes cleaning the grout without scratching or gouging it. Such surface blemishes include rust stains, algae stains, metal stains, swimfin stains, etc. on the pool walls and calcium build-up on ceramic tile. The cleaning composition is formed of two different sized aggregates used as the cleaning or abrasive element of the device and a selected polymer, described more fully below, which tool posts or encases each aggregate particle. As shown in FIG. 3, two different sizes of aggregates are used so that smaller aggregates 6 nest within the spaces between larger aggregates 5. This results in a denser packed concentration of the aggregate which improves results.

In developing the present invention, the inventor experimented with numerous types of binders (polymers) and aggregates. Each failed to achieve the superior and unexpected results of the present invention.

Different types of aggregates that were experimented with include: crushed walnut shells, which tended to be too tough, crushed corn cobs which were too soft, and crushed peach pits which also were too soft. Silicon carbide was used, but it was too hard and sharp, as was aluminum oxide. In addition, the inventor experimented by adding a powdered detergent to the aggregates, but that was deemed ineffective. Similarly, the inventor experimented by adding sawdust and cloth to the aggregates, but they too were deemed ineffective. Garnet was too sharp, tungsten carbide was too hard, and pumice was too soft.

The use of silica sand as the aggregate achieved the best results for providing the proper hardness and wearability for concrete.

In addition, experiments were performed with numerous binders. These include a two-part polyurethane casting system having a shore A hardness of 50–60 sold by Hexcel Corporation of California. However, the inventor found that the more suitable binder to achieve the desired balance with the silica sand was a mold compound marketed by Smooth On Corporation located in Gillette, N.J. known as PMC-121 having a shore A hardness of 50. Although uncertain, the inventor believes that this product achieves superior results because of its elongation at break property of 500%. However, other properties, or combinations of properties of the binder may be the reason why the superior results are achieved. The Smooth On PMC-121 product has the following properties. A viscosity of 1,400 cps, a specific gravity of 1.04 g/cm$^3$, a specific volume of 26.7 cubic inches per pound, Utimate tensile strength of 350 PSI, a shore A hardness of 50, a compression set of 16.5%, a 100% modulus of 100 PSI, and a tear strength of 65 PLI.

The materials selected for use in the present invention work in combination such that the binder which holds the aggregate material wears at substantially the same rate as the aggregate. Thus, as the aggregate wears down and loses its cleaning ability, the binder also wears down until the spent aggregate and binder fall off the device. As a result, a new layer of aggregate and binder are exposed to, provide a new cleaning surface. As shown in FIG. 3, the use of two sized aggregates, silica sand #20 and silica sand #30, work together such that the smaller silica sand 6 nestles into the spaces between adjacent larger particles of silica sand 5. The sand is also surrounded by the polymer 7. Moreover, silica sand is friable and therefore continually presents new cutting or cleaning edges to be used in cleaning the pool wall. The above advantages are achieved, in one aspect of the invention, by the following composition.

A composition of matter including the following elements in percentages by volume: 40% of a polymer having a 50 shore A hardness and an elongation at break of 500%, such as PMC 121/50 marketed by Smooth-On Corporation of Gillette, N.J. 5% MEK (methyl ethyl ketone), 27½% silica sand no. 20 and 27½% silica sand no. 30.

Figure 2:
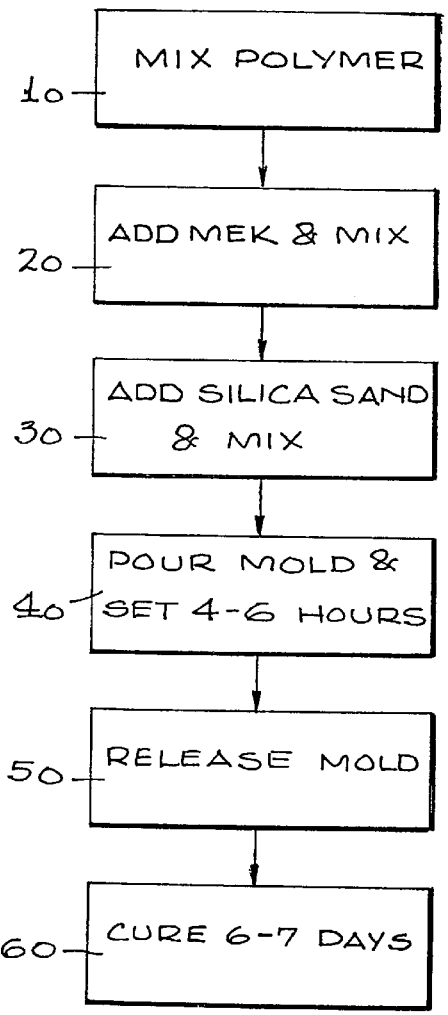
FIG. 2 is a flow chart of the method of making the cleaning tool of the invention.

FIG. 2 illustrates a method of making the cleaning tool of the invention. As Smooth-On PMC 121 is a two-part polymer, there is a part A and a part B which must be mixed together to form the product. Typically this is done in a pail with plastic spatula. In step 10, part A and part B are mixed at a 1:1 ratio for approximately 1 minute to constitute 40% of the entire volume to be made. Next, in step 20, MEK is added to the mix to constitute 5% of the volume of material to be made and the mix is continued to be mixed for another minute to two minutes. In step 30, 27½% silica sand no. 20 and 27½% silica sand no. 30 are added and the mixture is again mixed for a minute or two minutes. In step 40 the mixture is poured into a mold and allowed to set for 4–6 hours at room temperature. The mold is then released (step 50) and the product allowed to cure for an additional six or seven days (step 60).

FIG. 4 illustrates a mold 70 for use with the invention. As shown, the mold 70 has two parts 72 and 74 which join together when the composition is poured. Each part 72 and 74 have cut-outs 76 formed therein to form the shape of the molded tool. The top of each part of the mold 70 also has a semi-circle 80a or 80b formed therein such that when parts 72 and 74 are joined together semi-circles 80a and 80b form a full circle 82. The mold is then poured through the circle 82 and handle 2 is then inserted through the circle 82 into the mold. The mold is released by separating the two parts 72 and 74 of the mold 70.

FIG. 5 shows an alternate embodiment of the mold 70' in which multiple molds are stacked upon each other.

Having thereby described certain embodiments of the invention, it will be apparent to those skilled in the art that many modifications may be made within the scope of the invention. Therefore, the scope of the invention is only limited by the appended claims.

For example, in certain embodiments of the invention, titanium dioxide may be added to the mix in a small amount to suitably color the final product.

What is claimed is:

1. A method of cleaning tile grout, comprising:
   providing a tile grout cleaner including a first type of aggregate that is friable and a second type of aggregate that is friable, a binder for binding the first and second types of aggregate together;
   scrubbing the tile grout with the tile grout cleaner whereby the first and second type of aggregate and the binder all wear at substantially the same rate.

2. The method of claim 1, wherein the first type of aggregate is silica sand no. 20 and the second type of aggregate is silica no. 30, and the step of scrubbing includes scrubbing the tile grout with the tile grout cleaner whereby the silica sand no. 20, the silica sand no. 30, and the binder all wearing at substantially the same rate.

3. The method of claim 1, wherein the binder is a polymer having an elongation to break of 500%, a tensile strength of 350 PSI and shore A hardness of 50.

4. The method of claim 1, wherein the tile grout cleaner further comprises a polymer thinner.

5. The method of claim 4, wherein the polymer thinner is methyl ethyl ketone.

6. A method of cleaning tile grout, comprising:
   providing a tile grout cleaner including more than one type of cleaning element that is friable and a binder for the more than one cleaning element together;
   scrubbing the tile grout with the tile grout cleaner whereby the more than one type of cleaning element and the binder all wear at substantially the same rate.

7. The method of claim 6, wherein the more than one type of cleaning element is more than one type of silica sand.

* * * * *